US008351031B2

United States Patent
Fox et al.

(10) Patent No.: US 8,351,031 B2
(45) Date of Patent: Jan. 8, 2013

(54) SINGLE-SHOT SPECTRAL IMAGER

(75) Inventors: Marsha J. Fox, Lexington, MA (US);
Pajo Vujkovic-Cvijin, Burlington, MA
(US); Neil Goldstein, Belmont, MA
(US)

(73) Assignee: Spectral Sciences, Inc., Burlington, MA
(US)

( * ) Notice: Subject to any disclaimer, the term of this
patent is extended or adjusted under 35
U.S.C. 154(b) by 438 days.

(21) Appl. No.: 12/793,766

(22) Filed: Jun. 4, 2010

(65) Prior Publication Data

US 2010/0309467 A1 Dec. 9, 2010

Related U.S. Application Data

(60) Provisional application No. 61/184,516, filed on Jun. 5, 2009.

(51) Int. Cl.
*G01J 3/28* (2006.01)
(52) U.S. Cl. ........................................ 356/326; 356/324
(58) Field of Classification Search .................. 356/324,
356/326, 328
See application file for complete search history.

(56) References Cited

U.S. PATENT DOCUMENTS

| 6,996,292 | B1 | 2/2006 | Gentry et al. | |
|---|---|---|---|---|
| 7,283,231 | B2 | 10/2007 | Brady et al. | |
| 7,324,196 | B2 | 1/2008 | Goldstein et al. | |
| 7,336,353 | B2 * | 2/2008 | Brady et al. | 356/310 |
| 7,427,932 | B2 | 9/2008 | Brady et al. | |
| 7,432,843 | B2 | 10/2008 | Brady et al. | |
| 7,463,174 | B2 | 12/2008 | Brady et al. | |
| 7,463,179 | B2 | 12/2008 | Brady et al. | |
| 7,616,306 | B2 | 11/2009 | Brady et al. | |
| 7,652,765 | B1 * | 1/2010 | Geshwind et al. | 356/330 |
| 2010/0013979 | A1 * | 1/2010 | Golub et al. | 348/340 |
| 2010/0245818 | A1 * | 9/2010 | Viard et al. | 356/326 |
| 2010/0328659 | A1 * | 12/2010 | Bodkin | 356/326 |

OTHER PUBLICATIONS

Locke, A.M., et al., "Snapshot Imagaing Spectropolarimeter," Proceedings SPIE, vol. 4481, p. 64 (2002).
Smith, Mark W., et al, "Theoretical description and numerical simulations of a simplified Hadamard transform imaging spectrometer," Proceedings SPIE, vol. 4816, p. 372 (2002).

* cited by examiner

*Primary Examiner* — Layla Lauchman
(74) *Attorney, Agent, or Firm* — Brian M. Dingman; Mirick, O'Connell, DeMallie & Lougee LLP

(57) ABSTRACT

A single-shot spectral imager or imaging system which acquires multiplexed spatial and spectral data in a single snapshot with high optical collection efficiency and with the speed limited only by the readout time of the detector circuitry. The imager uses dispersive optics together with spatial light modulators to encode a mathematical transform onto the acquired spatial-spectral data. A multitude of encoded images is recorded simultaneously on a focal plane array and subsequently decoded to produce a spectral/spatial hypercube.

23 Claims, 3 Drawing Sheets

SINGLE-SHOT SPECTRAL IMAGER

CROSS-REFERENCE TO RELATED APPLICATION

This application claims priority of Provisional application Ser. No. 61/184,516 filed on Jun. 5, 2009. The disclosure of the Provisional application is incorporated by reference herein.

STATEMENT REGARDING FEDERALLY SPONSORED RESEARCH

This invention was made with government support under contract #HQ0006-06-C-7470 for the Missile Defense Agency. The government has certain rights in this invention.

FIELD OF THE INVENTION

The present invention is in the technical field of spectral imaging, also known as hyperspectral imaging, multispectral imaging or imaging spectrometry. More particularly, the present invention is in the technical field of spectral imagers with single-exposure simultaneous capture of spatial and spectral data, also known as "single-shot" or "snapshot" spectral imaging.

BACKGROUND OF THE INVENTION

Traditional scanning spectral imagers acquire two spatial dimensions of the signal on a focal plane array (FPA), and use successive FPA frames in time and a spectral modulator to acquire the spectral dimension. This approach is only effective for scenes that are temporally static over the duration of the spatial/spectral data acquisition (acquisition of a "hypercube"). For fast changing events, such as transient phenomena, either the modulation rate of the spectral modulator or the frame rate of the FPA, or both, must be increased dramatically. Alternatively, in the "single-shot" approach to spectral imaging, the entire spectral/spatial image is acquired in a single FPA frame. To synthesize three dimensions from a two dimensional focal plane array, at least two dimensions must be multiplexed, that is, combined in such a way that spectral and spatial components can be unambiguously redistributed into their respective dimensions using post processing transformations.

SUMMARY OF THE INVENTION

The Multiplexing Array Spectral Camera (MASC) of the invention may use certain aspects of a family of non-scanning, slitless, two-dimensional imaging spectrometers that use Hadamard Transform Spectroscopy (HTS) technology to spectrally encode the incoming light.

The multiplex advantage of the MASC imager makes it possible for this instrument to rival or exceed the optical efficiency of prior art single-shot spectral imagers like Computed Tomographic Imaging Spectrometer (CTIS). Unlike CTIS, though, MASC uses simpler optics, makes better use of the available FPA pixels, and offers fast data processing, relative to slow tomographic reconstruction needed for CTIS. Furthermore, unlike CTIS, the MASC imager has no spatial-spectral blind spots (the "missing cone"), improving its effectiveness in detecting fine spectral structures.

Advantages of the present invention include, without limitation, the following:

(1) "multiplex advantage," gained from the use of transform spectroscopy which makes it possible to collect radiation from a plurality N of spectral bands simultaneously; resulting in the signal-to-noise increase of the factor of $N^{1/2}/2$ relative to non-multiplexed (one band at a time) collection of spectral data;
(2) the ability to collect spatial-spectral information over the entire incoming spatial-spectral space without gaps, unlike that of one alternative approach (CTIS);
(3) production of single-shot hyperspectral image;
(4) simple and robust optics;
(5) fast data processing.

This invention features a multiplexing array spectral imager for simultaneously acquiring multiplexed spatial and spectral data from incoming light representing a scene, comprising a two-dimensional focal plane array (FPA) for capturing an image, the FPA defining a plurality of pixels, a first optical system that creates a plurality of intermediate sub-images each representing at least part of the imaged scene, a second optical system that includes a spectrally dispersive element and creates a spectrally dispersed image for each sub-image created by the first optical system, a spatial light modulator (SLM) that receives the spectrally dispersed sub-images, the SLM defining a two-dimensional array of encoding sub-masks each containing a plurality of elements that either transmit, block or reflect some or all of the light that impinges on them to thereby accomplish a transform of the spectral data within the dispersed sub-images and create spectrally-encoded intermediate sub-images, a third optical system that receives spectrally dispersed and encoded intermediate sub-images and includes a spectrally de-dispersive element, to spectrally de-disperse the intermediate sub-images and create a plurality of spectrally encoded sub-images that are imaged onto the FPA, and a processing system that applies the inverse transform to the sub-images that were imaged onto the FPA, to produce a set of spectrally and spatially resolved images.

The second optical system may comprise a first polychromator. The first polychromator may comprise one or more collimating lenses, one or more dispersive elements and one or more imaging lenses. The first polychromator may comprise a first lenslet array, a first dispersive element or a first array of dispersive elements, and a second lenslet array. The first and second lenslet arrays may each define at least N lenslets, where N equals the number of spectral bands in the acquired spectral image.

The third optical system may comprise a second polychromator. The second polychromator may comprise one or more collimating lenses, one or more dispersive elements and one or more imaging lenses. The second polychromator may comprise a third lenslet array, a second dispersive element or a second array of dispersive elements, and a fourth lenslet array. The third and fourth lenslet arrays may each define at least N lenslets, where N equals the number of spectral bands in the acquired spectral image.

There may be at least N dispersed sub-images, and the SLM may define at least the same quantity of sub-masks as sub-images. Each sub-mask may contain a number of elements N equal to the number of spectral bands N defined by the imager. The encoding sub-masks may represent one-dimensional spectral Hadamard transforms in the form of Simplex or S-matrices. The encoding sub-masks may be transmission or reflection masks. The masks may have fixed transmission or reflection characteristics. The masks may be electronically controlled such that the modulation accomplished by the masks can be changed.

The SLM may comprise an array of spectrally-varying filters that isolates the spectral Fourier components of the image in the sub-images. The multiplexing array spectral imager may further comprise a second FPA, and a fourth optical system that receives light reflected from the SLM and creates a plurality of encoded sub-images that are imaged onto the second FPA. The encoding sub-masks in this case may represent one-dimensional spectral Hadamard or Hadamard-Walsh transforms. Spectral content received from all bands may be simultaneously utilized.

Also featured is a multiplexing array spectral imager for simultaneously acquiring multiplexed spatial and spectral data from incoming light representing a scene, comprising a two-dimensional focal plane array (FPA) for capturing an image, the FPA defining a plurality of pixels, a first optical system in the light path that creates a plurality of intermediate sub-images each representing the imaged scene, a spatial light modulator (SLM) that receives the intermediate sub-images, the SLM defining a two-dimensional array of encoding sub-masks each containing a plurality of elements that either transmit, block or reflect some or all of the light that impinges on them, to thereby accomplish a transform of the spatial data within the intermediate sub-images and create spatially-encoded intermediate sub-images, a second optical system that receives the encoded intermediate sub-images and includes a spectrally dispersive element and creates a plurality of spectrally resolved sub-images that are imaged onto the FPA, and a processing system that applies an algorithm to the sub-images that were imaged onto the FPA, to produce a set of spectrally and spatially resolved images.

Further featured is a multiplexing array spectral imager for simultaneously acquiring multiplexed spatial and spectral data from incoming light representing a scene, comprising a two-dimensional focal plane array (FPA) for capturing an image, the FPA defining a plurality of pixels, a first optical system that creates a plurality of intermediate sub-images each representing at least part of the imaged scene, a second optical system that includes a spectrally dispersive element and creates a spectrally dispersed image for each sub-image created by the first optical system, a spatial light modulator (SLM) that receives the spectrally dispersed sub-images, the SLM defining a two-dimensional array of encoding sub-masks each containing a plurality of elements that either transmit, block or reflect some or all of the light that impinges on them to thereby accomplish a transform of spectral data within the intermediate sub-images and create spectrally encoded intermediate sub-images, a third optical system that receives the spectrally dispersed and encoded intermediate sub-images and includes a spectrally de-dispersive element, to spectrally de-disperse intermediate sub-images and create a plurality of spectrally encoded sub-images that are imaged onto the FPA, a processing system that applies the inverse transform to the sub-images that were imaged onto the FPA, to produce a set of spectrally and spatially resolved images, and a processing system that enhances the spatial resolution of the final image based on information contained in multiple sub-images acquired simultaneously. The SLM may comprise an array of interference filters designed to produce a modulated spectral transmission or reflection, comprising a series of sine waves of varying frequencies and spectral shifts representing a spectral Fourier series, such that the spectral component of each sub-image after the SLM represents a component of the intended spectral transform.

Still further featured is a multiplexing array spectral imager for simultaneously acquiring multiplexed spatial and spectral data from incoming light representing a scene, comprising a two-dimensional focal plane array (FPA) for capturing an image, the FPA defining a plurality of pixels, a first optical system that creates a plurality of intermediate sub-images each representing at least part of the imaged scene, a second optical system that includes a spectrally dispersive element and creates a spectrally dispersed image for each sub-image created by the first optical system in which the second optical system comprises a first polychromator comprising a first lenslet array, a first dispersive element or a first array of dispersive elements, and a second lenslet array, in which the first and second lenslet arrays each define at least N lenslets, where N equals the number of spectral bands in the acquired spectral image, a spatial light modulator (SLM) that receives the spectrally dispersed sub-images, the SLM defining a two-dimensional array of encoding sub-masks each containing a plurality of elements that either transmit, block or reflect some or all of the light that impinges on them to thereby accomplish a transform of the spectral data within the dispersed sub-images and create spectrally-encoded intermediate sub-images, in which there are at least N dispersed sub-images and the SLM defines the same quantity of sub-masks as sub-images, in which each sub-mask contains a number of elements N equal to the number of spectral bands N defined by the imager, a third optical system that receives spectrally dispersed and encoded intermediate sub-images and includes a spectrally de-dispersive element, to spectrally de-disperse the intermediate sub-images and create a plurality of spectrally encoded sub-images that are imaged onto the FPA, in which the third optical system comprises a second polychromator comprising a third lenslet array, a second dispersive element or a second array of dispersive elements, and a fourth lenslet array, in which the third and fourth lenslet arrays each define at least N lenslets, where N equals the number of spectral bands in the acquired spectral image, and a processing system that applies the inverse transform to the sub-images that were imaged onto the FPA, to produce a set of spectrally and spatially resolved images.

DETAILED DESCRIPTION OF EMBODIMENTS OF THE INVENTION

Figure 1A:
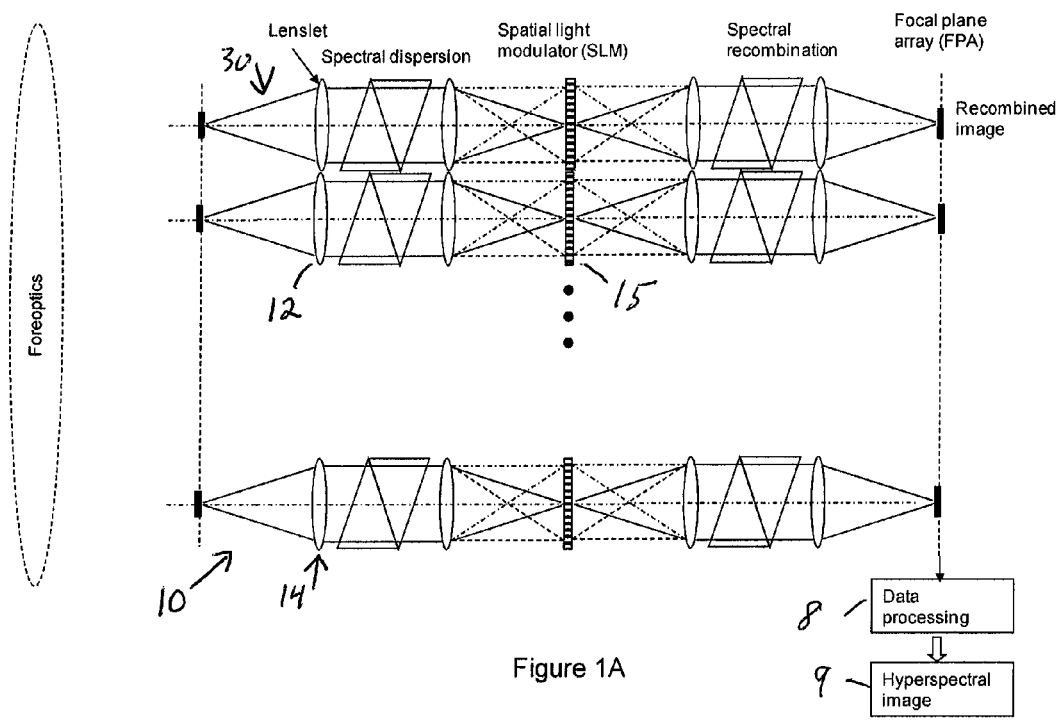
FIG. 1A is a schematic diagram of the single-shot spectral imager showing a plurality of sub-images collected.
Figure 1B:
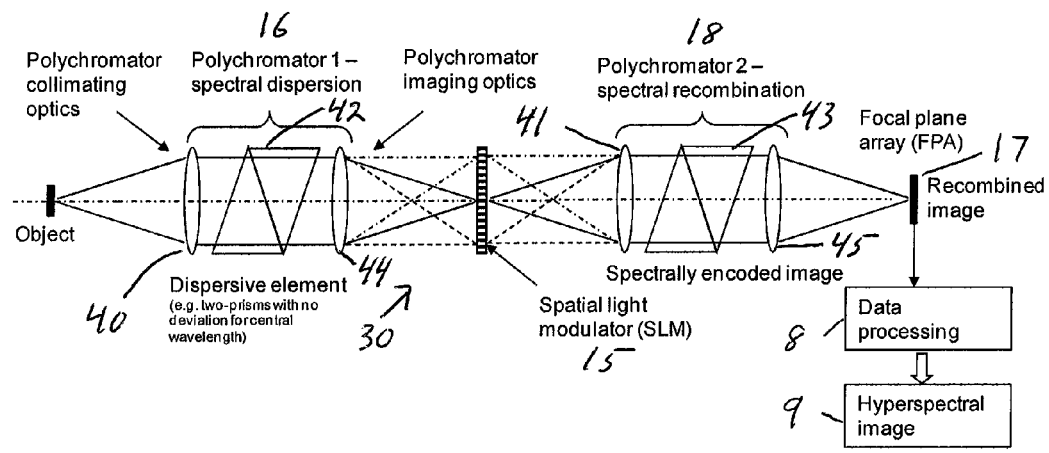
FIG. 1B is a more detailed schematic diagram of the preferred embodiment of the optical path for a single sub-image in the preferred embodiment of the single-shot spectral imager.

The MASC imager 10 presented on FIGS. 1A and 1B may use lenslet arrays to divide the focal plane into a plurality of (N) spectrally encoded sub-images. To obtain the single-shot spectral image, light from the object passes through a spectral encoder consisting of: (1) a two dimensional lenslet array, (2) a spectrally dispersing element (3) a spatial light modulator (SLM) and (4) a spectrally de-dispersing (spectrally recombining) element. A single lenslet subsystem optical path is presented in FIG. 1B. The light is spectrally dispersed by the spectrally dispersing element and an intermediate, dispersed sub-image is formed at the SLM plane. The number of sub-images is at least equal to the number of spectral bands N to be recorded. The SLM for each intermediate sub-image may be a static transmission mask containing N binary on-off elements corresponding to the Hadamard transform (HT) or other orthogonal or non-orthogonal transform method.

The spectrally-encoded intermediate sub-image is then spectrally de-dispersed by a second polychromator. The resulting N spectrally encoded sub-images are then formed on a single FPA detector. Subsequent numerical processing as is known in the field then generates a spectral image with N resolved spectral bands. Image post-processing can additionally be used to enhance spatial resolution relative to that of a single sub-image, to the limiting resolution determined by the size of the receiving aperture, in this case determined by the furthest separation of lenslets in the array.

Figure 2:
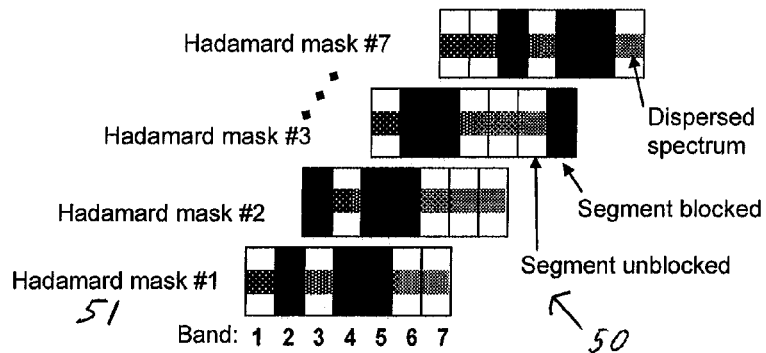
FIG. 2 schematically depicts examples of a sequence of Hadamard masks corresponding to seven-element Hadamard spectral encoding, as an example for the preferred embodiment of the single-shot spectral imager.

Referring now to the preferred embodiment of the invention in more detail, FIG. 1B shows a single subsystem 30, i.e. the optical system corresponding to a single lenslet within the array of lenslets 14 presented on FIG. 1A. A single lenslet 12 produces a single sub-image. Each subsystem optical train contains two polychromators (16, 18), each consisting of a collimating lens (40, 41), a dispersive element (42, 43) and an imaging lens (44, 45). The first polychromator produces a spectrally dispersed image on the SLM 15. The SLM is represented by a series of transmissive masks 50, each mask containing N binary elements that either transmit or block (either by absorption or reflection) the light at the corresponding spectral/spatial position. See FIG. 2. The pattern of transmitted/blocked elements is governed by the transform used. Each mask (e.g., mask 51) contains N binary elements, where N is the number of spectral bands. In the illustrative, non-limiting example of FIG. 2 there are seven masks, each with seven such binary elements. Approximately N/2 elements in each Hadamard mask of the order N transmit light.

After the spectral modulation is encoded onto the dispersed image, the second polychromator de-disperses this image into a polychromatic image projected onto the corresponding sub-image section of the FPA 17 (FIGS. 1A and 1B). Each subsystem (lenslet and the associated optics in its optical train) in the array produces its own encoded sub-image. The data processing system shown on FIGS. 1A and 1B consists of a programmed digital computer 8 performing inverse Hadamard transform calculations on the acquired digital image data that result in a hyperspectral image output 9, as is well known in the field.

A multitude of individual optical trains each corresponding to one lenslet and producing encoded sub-images on the FPA as described above are used in this embodiment of the MASC imager. The dispersing element in each polychromator can be, for example, a single prism, an assembly of prisms, a grism, or a diffraction grating, either transmissive or reflective. Either three or four lenslet arrays are needed in the complete system to generate an array of sub-images.

The encoding masks are stationary transmission masks representing one-dimensional spectral Hadamard transform in the form of Simplex or S-matrices. In the preferred embodiment these masks are generated by photolithography on a transparent optical-quality substrate.

In summary, in the preferred embodiment of the single-shot spectral imager, each point in the object plane is mapped to specific spectrally encoded (via Hadamard transform) pixels in the image (FPA) plane. The spectrum of each pixel of the object can be retrieved by decoding the corresponding pixels in each sub-image. Pixel intensities and positions, as read out from the FPA, contain all the information necessary to retrieve spatial and spectral information originating at the object plane of the instrument. Spatial resolution is not governed solely by the spatial resolution of individual sub-images, but can be enhanced with a super-resolution post-processing algorithm known in the field that reconstructs the spatial image in the multitude of spectral bands from a multitude of individual sub-images.

Figure 3:
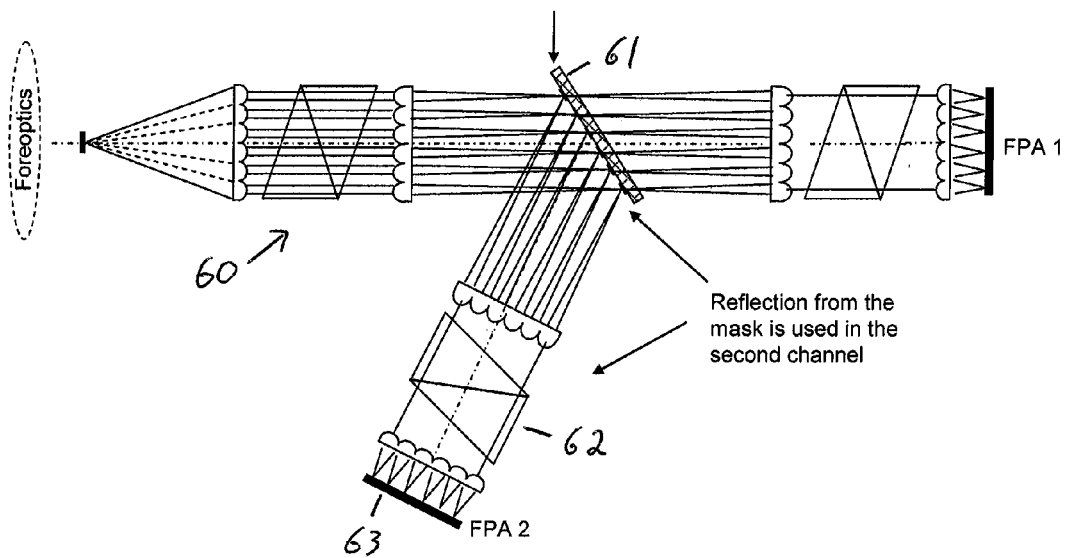
FIG. 3 is a schematic diagram of an alternative embodiment with improved optical collection efficiency for spectral data acquisition.

Alternative Embodiments:

The preferred embodiment of the MASC imager collects radiation from approximately N/2 spectral bands at each sub-image. In an alternative embodiment all of the radiation energy contained in all N bands is used, without any systemic loss. FIG. 3 shows the design of such an imager 60. Unlike the imager depicted in FIGS. 1A and 1B, the reflection from the SLM 61 in FIG. 3 is captured with a second detector 63, with a polychromator 62 in front of it, and analyzed. In this case, Simplex or S-matrices cannot be used, but original Hadamard (or Hadamard-Walsh) matrices must be used instead. Simplex or S-matrices use digital elements 1 and 0, translated into blocked and unblocked mask segments. Such a system throws away half of the light (each "0" throws away light). On the other hand, original Hadamard also known as Hadamard-Walsh matrices use elements 1 and −1 which translate into "add mask segment" and "subtract mask segment". When a reflective SLM reproducing Hadamard-Walsh sub-masks is used as on FIG. 3, the output of one detector is multiplied by +1, the output of the other detector is multiplied by −1 and the two signals are summed together. There is no loss of half the light in this case.

In another embodiment, it is recognized that spectral de-dispersion in the optical train of the instrument is not strictly necessary in order to apply Hadamard spectral encoding. The spatial and spectral content of an encoded spatial-spectral image is possible to retrieve unambiguously with the signal processing algorithm described in the Appendix. An advantage of this embodiment is a simpler system and better optical efficiency with fewer optical components relative to the preferred embodiment. A disadvantage is that spatial and spectral resolution becomes related to each other as a consequence of applying the Hadamard encoding mask to the image before it is spectrally resolved.

Figure 4:
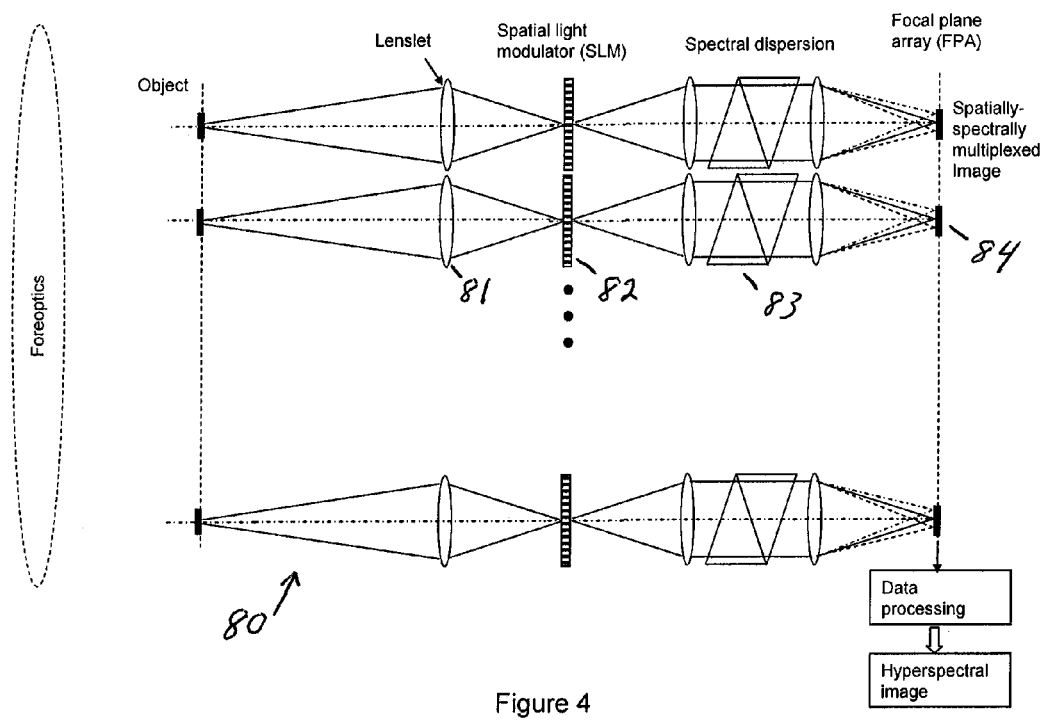
FIG. 4 is a schematic diagram of a simplified alternative embodiment that does not perform de-dispersion of sub-images optically.

FIG. 4 shows the optical system of the embodiment of the MASC spectral imager 80 that does not contain a de-dispersion polychromator in the optical system and thus produces mixed spatial-spectral images. The image of the object, created in the image plane of each microlens or lenslet 81, is encoded with a Hadamard Simplex mask 82. The encoded sub-image is then spectrally resolved by a dispersive polychromator 83 consisting, as before, of a dispersive element and its associated collimating and imaging lenses. The dispersed sub-image is subsequently sent to the FPA 84 with a suitable magnification at the output lens of the polychromator. The resulting sub-image at the FPA does not represent a faithful spatial image of the object in this case, since it contains both spatial and spectral information superimposed.

As the algorithm summarized in the Appendix shows, the Hadamard Simplex encoding imposed by the binary mask (SLM on FIG. 4) permits unambiguous separation of spatial and spectral information that is present in the ensemble of acquired sub-images. This system has potential to be a very compact, low cost, high throughput hyperspectral imager. Operating with an uncooled detector, it would have very low power requirements.

In the preferred embodiment the light is divided into sub-images by a lenslet array. Other embodiments of the invention accomplish such light division by other optical systems/arrangements, including:
1) An array of mirrors performing the imaging function of lenslets.
2) An array of optical subsystems, where each subsystem is corrected for optical aberrations (astigmatism, coma) originating from its off-axis position in the pupil.
3) A series of beam splitters sequentially splitting off multiple images.
4) A mirror-based beam splitter using multiple reflections between two mirror faces, with a gradation of reflection. An image is partially transmitted at each reflection. An example of such device is a slab of transparent material with a variable-reflectivity coating applied to the output plane of the slab. In order for all images to have the same average intensity, the transmission T at reflection N in this case is given by $T_N = T_{N-1}/(1-T_{N-1})$, where the previous mirror reflection is denoted by N−1.
5) A single multifaceted beamsplitting prism or an array of multifaceted beamsplitting prisms. Examples of such device include a pyramid beamsplitter.

The stationary, binary SLM is used to form Hadamard masks to modulate each sub-image in the preferred embodiment. Other embodiments of the invention can accomplish modulation of the sub-images as follows:
1) An electronically controlled binary SLM can be used to form a modulating mask. In a single shot, the SLM would remain stationary and collect spatial and spectral information just as in the preferred embodiment. However, from shot to shot, the mask on the SLM could change, for instance, to change spectral resolution, or in the case of a system with no de-dispersion element, to change both spatial and spectral resolution or to turn spectral resolution off. This can be accomplished, for example, using a digital micromirror-based SLM or a digital liquid crystal SLM.
2) The SLM could consist of an array of spectrally-varying transmission filters designed to modulate the sub-image using alternative transform methodologies. For instance, a filter that isolates the spectral Fourier components of the image in the sub-images. The resultant images are processed with the intended spectral transformation to obtain a spectrally-resolved image. This retains the multiplexing advantage and single-shot spectral image production of the preferred embodiment.
3) The dispersion and de-dispersion elements are absent and the lenslet array images the scene onto the SLM. The SLM consists of an array of filters matched to the lenslet array that spectrally modulate the sub-images using spectral transform methodologies. The filters, for instance, could be interference filters designed to produce a modulated spectral transmission or reflection, for instance a series of sine waves of varying frequencies and spectral shifts representing a spectral Fourier series. The filters are designed in such a way that the spectral component of each sub-image after the SLM represents a component of the intended spectral transform. The resultant images are processed with the intended spectral transformation to obtain a spectrally resolved image. This retains the multiplexing advantage and single-shot spectral image production of the preferred embodiment.

Dispersive elements contained in polychromators used in this invention can be discrete elements, arranged such that each subsystem contains separate dispersive elements in its polychromators. In an alternative embodiment, a large dispersive element such as a grating or a prism can be shared between all or some of the subsystems, within their respective polychromators.

The inventive MASC spectral imager can operate in any spectral region from ultraviolet to far infrared. It provides high performance at moderate cost for applications in atmospheric remote sensing, particularly for quantification of atmospheric gases including detection of trace gases and detection of gas leaks from containers. It can also be used for terrestrial remote sensing particularly for geological and agricultural applications. Other applications include industrial sensors aimed at process control, sensors that aid medical diagnostics, and numerous other applications where dynamic phenomena must be recorded in a spectrally and spatially resolved form.

Appendix: Decoding Algorithm for Hadamard Simplex Encoded Spatial-Spectral Images According to Smith et al., *Theoretical description and numerical simulations of a simplified Hadamard transform imaging spectrometer*, Proc. SPIE, Vol. 4816, 372 (2002) the response Rw of the pixel k' of the FPA, for state h of the Hadamard mask, is $$R_{hk'} = \sum_k S_{hk} I_{kk'}$$

where $S_{hk}$ is element h of the Hadamard Simplex transform for DMA pixel k, $I_{kk'}$ is radiance that originated at DMA pixel k and arrived at FPA pixel k'. Summation extends over all DMA pixels that contribute radiance to FPA pixel k'.

After the FPA is read out, the spatial and spectral information can be separated based on the inverted radiance $\bar{I}_{jj'}$ that originated at DMA pixel j and arrived at FPA pixel j' which is determined by $$\bar{i}_{jj'} = \sum_h S^{-1}_{jh} R_{hj'}$$

where $S^{-1}_{jh}$ is element h of the inverse Hadamard Simplex transform for DMA pixel j, and $R_{hj'}$ is the response of FPA pixel j' for state h of the Hadamard mask. Summation extends over the sequence length of the Hadamard Simplex encoding.

Indeed, the algorithm described recovers radiance $I_{jj'}$ since, after substituting $R_{hj'}$ above, we obtain $$\bar{I}_{jj'} = \sum_h \sum_k S^{-1}_{jh} S_{hk} I_{kj'}$$

and further, based on the Kronecker δ orthogonality property for the Hadamard Simplex transform, $$\sum_h S^{-1}_{jh} S_{hk} = \delta_{jk}$$

previous equation shows that $$i_{jj'} = \sum_k \delta_{jk} I_{kj'} = I_{jj'}$$

i.e., the algorithm recovers unambiguously the radiance that originated at DMA pixel j and arrived at FPA pixel j'.

While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope and spirit of the invention.

What is claimed is:

1. A multiplexing array spectral imager for simultaneously acquiring multiplexed spatial and spectral data from incoming light representing a scene, comprising:
   a two-dimensional focal plane array (FPA) for capturing an image, the FPA defining a plurality of pixels;
   a first optical system that creates a plurality of intermediate sub-images each representing at least part of the imaged scene;
   a second optical system that includes a spectrally dispersive element and creates a spectrally dispersed image for each sub-image created by the first optical system;
   a spatial light modulator (SLM) that receives the spectrally dispersed sub-images, the SLM defining a two-dimensional array of encoding sub-masks each containing a plurality of elements that either transmit, block or reflect some or all of the light that impinges on them to thereby accomplish a transform of the spectral data within the spectrally dispersed sub-images and create spectrally-encoded intermediate sub-images;
   a third optical system that receives spectrally dispersed and encoded intermediate sub-images and includes a spectrally de-dispersive element, to spectrally de-disperse the intermediate sub-images and create a plurality of spectrally encoded sub-images that are imaged onto the FPA; and
   a processing system that applies the inverse transform to the sub-images that were imaged onto the FPA, to produce a set of spectrally and spatially resolved images.

2. The multiplexing array spectral imager of claim 1 in which the second optical system comprises a first polychromator.

3. The multiplexing array spectral imager of claim 2 in which the first polychromator comprises one or more collimating lenses, one or more dispersive elements and one or more imaging lenses.

4. The multiplexing array spectral imager of claim 3 in which the first polychromator comprises a first lenslet array, a first dispersive element or a first array of dispersive elements, and a second lenslet array.

5. The multiplexing array spectral imager of claim 4 in which the first and second lenslet arrays each define at least N lenslets, where N equals the number of spectral bands in the acquired spectral image.

6. The multiplexing array spectral imager of claim 5 in which the third optical system comprises a second polychromator.

7. The multiplexing array spectral imager of claim 6 in which the second polychromator comprises one or more collimating lenses, one or more dispersive elements and one or more imaging lenses.

8. The multiplexing array spectral imager of claim 7 in which the second polychromator comprises a third lenslet array, a second dispersive element or a second array of dispersive elements, and a fourth lenslet array.

9. The multiplexing array spectral imager of claim 8 in which the third and fourth lenslet arrays each define at least N lenslets, where N equals the number of spectral bands in the acquired spectral image.

10. The multiplexing array spectral imager of claim 1 in which there are at least N spectrally dispersed sub-images, and the SLM defines the same quantity of sub-masks as sub-images.

11. The multiplexing array spectral imager of claim 10 in which each sub-mask contains a number of elements N equal to the number of spectral bands N defined by the imager.

12. The multiplexing array spectral imager of claim 1 in which the encoding sub-masks represent one-dimensional spectral Hadamard transforms in the form of Simplex or S-matrices.

13. The multiplexing array spectral imager of claim 12 in which the encoding sub-masks are transmission or reflection masks.

14. The multiplexing array spectral imager of claim 13 in which the masks have fixed transmission or reflection characteristics.

15. The multiplexing array spectral imager of claim 13 in which the masks are electronically controlled such that the modulation accomplished by the masks can be changed.

16. The multiplexing array spectral imager of claim 1 in which the SLM comprises an array of spectrally-varying filters that isolates the spectral Fourier components of the image in the sub-images.

17. The multiplexing array spectral imager of claim 1 further comprising a second FPA, and a fourth optical system that receives light reflected from the SLM and creates a plurality of encoded sub-images that are imaged onto the second FPA.

18. The multiplexing array spectral imager of claim 17 in which the encoding sub-masks represent one-dimensional spectral Hadamard or Hadamard-Walsh transforms.

19. The multiplexing array spectral imager of claim 17 in which spectral content received from all bands is simultaneously utilized.

20. A multiplexing array spectral imager for simultaneously acquiring multiplexed spatial and spectral data from incoming light representing a scene, comprising:
   a two-dimensional focal plane array (FPA) for capturing an image, the FPA defining a plurality of pixels;
   a first optical system in the light path that creates a plurality of intermediate sub-images each representing the imaged scene;
   a spatial light modulator (SLM) that receives the intermediate sub-images, the SLM defining a two-dimensional array of encoding sub-masks each containing a plurality of elements that either transmit, block or reflect some or all of the light that impinges on them, to thereby accomplish a transform of the spatial data within the intermediate sub-images and create spatially-encoded intermediate sub-images;
   a second optical system that receives the encoded intermediate sub-images and includes a spectrally dispersive element and creates a plurality of spectrally resolved sub-images that are imaged onto the FPA; and
   a processing system that applies an algorithm to the sub-images that were imaged onto the FPA, to produce a set of spectrally and spatially resolved images.

21. A multiplexing array spectral imager for simultaneously acquiring multiplexed spatial and spectral data from incoming light representing a scene, comprising:
- a two-dimensional focal plane array (FPA) for capturing an image, the FPA defining a plurality of pixels;
- a first optical system that creates a plurality of intermediate sub-images each representing at least part of the imaged scene;
- a second optical system that includes a spectrally dispersive element and creates a spectrally dispersed image for each sub-image created by the first optical system;
- a spatial light modulator (SLM) that receives the spectrally dispersed sub-images, the SLM defining a two-dimensional array of encoding sub-masks each containing a plurality of elements that either transmit, block or reflect some or all of the light that impinges on them to thereby accomplish a transform of spectral data within the intermediate sub-images and create spectrally encoded intermediate sub-images;
- a third optical system that receives the spectrally dispersed and encoded intermediate sub-images and includes a spectrally de-dispersive element, to spectrally de-disperse intermediate sub-images and create a plurality of spectrally encoded sub-images that are imaged onto the FPA; and
- a processing system that applies the inverse transform to the sub-images that were imaged onto the FPA, to produce a set of spectrally and spatially resolved images, and a processing system that enhances the spatial resolution of the final image based on information contained in multiple sub-images acquired simultaneously.

22. The multiplexing array spectral imager of claim 21 in which the SLM comprises an array of interference filters designed to produce a modulated spectral transmission or reflection, comprising a series of sine waves of varying frequencies and spectral shifts representing a spectral Fourier series, such that the spectral component of each sub-image after the SLM represents a component of the intended spectral transform.

23. A multiplexing array spectral imager for simultaneously acquiring multiplexed spatial and spectral data from incoming light representing a scene, comprising:
- a two-dimensional focal plane array (FPA) for capturing an image, the FPA defining a plurality of pixels;
- a first optical system that creates a plurality of intermediate sub-images each representing at least part of the imaged scene;
- a second optical system that includes a spectrally dispersive element and creates a spectrally dispersed image for each sub-image created by the first optical system in which the second optical system comprises a first polychromator comprising a first lenslet array, a first dispersive element or a first array of dispersive elements, and a second lenslet array, in which the first and second lenslet arrays each define at least N lenslets, where N equals the number of spectral bands in the acquired spectral image;
- a spatial light modulator (SLM) that receives the spectrally dispersed sub-images, the SLM defining a two-dimensional array of encoding sub-masks each containing a plurality of elements that either transmit, block or reflect some or all of the light that impinges on them to thereby accomplish a transform of the spectral data within the dispersed sub-images and create spectrally-encoded intermediate sub-images, in which there are at least N dispersed sub-images and the SLM defines the same quantity of sub-masks as sub-images, in which each sub-mask contains a number of elements N equal to the number of spectral bands N defined by the imager;
- a third optical system that receives spectrally dispersed and encoded intermediate sub-images and includes a spectrally de-dispersive element, to spectrally de-disperse intermediate sub-images and create a plurality of spectrally encoded sub-images that are imaged onto the FPA, in which the third optical system comprises a second polychromator comprising a third lenslet array, a second dispersive element or a second array of dispersive elements, and a fourth lenslet array, in which the third and fourth lenslet arrays each define at least N lenslets, where N equals the number of spectral bands in the acquired spectral image; and
- a processing system that applies the inverse transform to the sub-images that were imaged onto the FPA, to produce a set of spectrally and spatially resolved images.

* * * * *